(12) United States Patent
Sharma et al.

(10) Patent No.: US 11,474,904 B2
(45) Date of Patent: Oct. 18, 2022

(54) SOFTWARE-DEFINED SUSPECTED STORAGE DRIVE FAILURE IDENTIFICATION

(71) Applicant: EMP IP Holding Company LLC, Hopkinton, MA (US)

(72) Inventors: Anurag Sharma, Cedar Park, TX (US); Brian P. Korinek, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/078,217

(22) Filed: Oct. 23, 2020

(65) Prior Publication Data

US 2022/0129350 A1    Apr. 28, 2022

(51) Int. Cl.
| | |
|---|---|
| *G06F 11/14* | (2006.01) |
| *G06F 11/30* | (2006.01) |
| *G06F 11/07* | (2006.01) |
| *G06N 5/02* | (2006.01) |
| *G06F 3/06* | (2006.01) |

(52) U.S. Cl.
CPC .......... *G06F 11/1435* (2013.01); *G06F 3/067* (2013.01); *G06F 3/0619* (2013.01); *G06F 3/0659* (2013.01); *G06F 11/076* (2013.01); *G06F 11/0772* (2013.01); *G06F 11/3034* (2013.01); *G06N 5/025* (2013.01)

(58) Field of Classification Search
CPC ............... G06F 11/1435; G06F 11/076; G06F 11/0772; G06F 11/3034; G06F 3/0619; G06F 3/0659; G06F 3/067; G06N 5/025
See application file for complete search history.

(56) References Cited

U.S. PATENT DOCUMENTS

| | | | |
|---|---|---|---|
| 7,631,067 B2 | 12/2009 | Smith | |
| 7,930,583 B1 | 4/2011 | Vemuri et al. | |
| 9,031,329 B1* | 5/2015 | Farid ...................... | G06V 20/80 382/209 |
| 10,372,354 B1 | 8/2019 | Parvathareddy et al. | |
| 2007/0076321 A1 | 4/2007 | Takahashi et al. | |
| 2011/0113313 A1* | 5/2011 | Thiesfeld .............. | H03M 13/09 714/807 |

(Continued)

*Primary Examiner* — Jigar P Patel

(74) *Attorney, Agent, or Firm* — Ryan, Mason & Lewis, LLP

(57) ABSTRACT

Methods, apparatus, and processor-readable storage media for software-defined suspected storage drive failure identification are provided herein. An example computer-implemented method includes implementing at least one software agent in an operating system associated with at least one storage system, wherein the at least one software agent is configured to monitor and process one or more predefined storage drive attributes; obtaining, using the at least one software agent, attribute values for the one or more predefined storage drive attributes from one or more storage drives within the at least one storage system; identifying, using the at least one software agent, at least one suspected failure among the one or more storage drives by processing the obtained attribute values using algorithmic logic; and performing at least one automated action based on the at least one identified suspected failure among the one or more storage drives.

20 Claims, 6 Drawing Sheets

(56) References Cited

U.S. PATENT DOCUMENTS

| | | | | |
|---|---|---|---|---|
| 2015/0006957 A1* | 1/2015 | Ginzinger | ............... | G06F 3/067 |
| | | | | 714/15 |
| 2015/0012794 A1* | 1/2015 | Losh | ................... | G06F 11/1048 |
| | | | | 714/755 |
| 2015/0074450 A1* | 3/2015 | Blount | ................ | G06F 11/0727 |
| | | | | 714/6.1 |

* cited by examiner

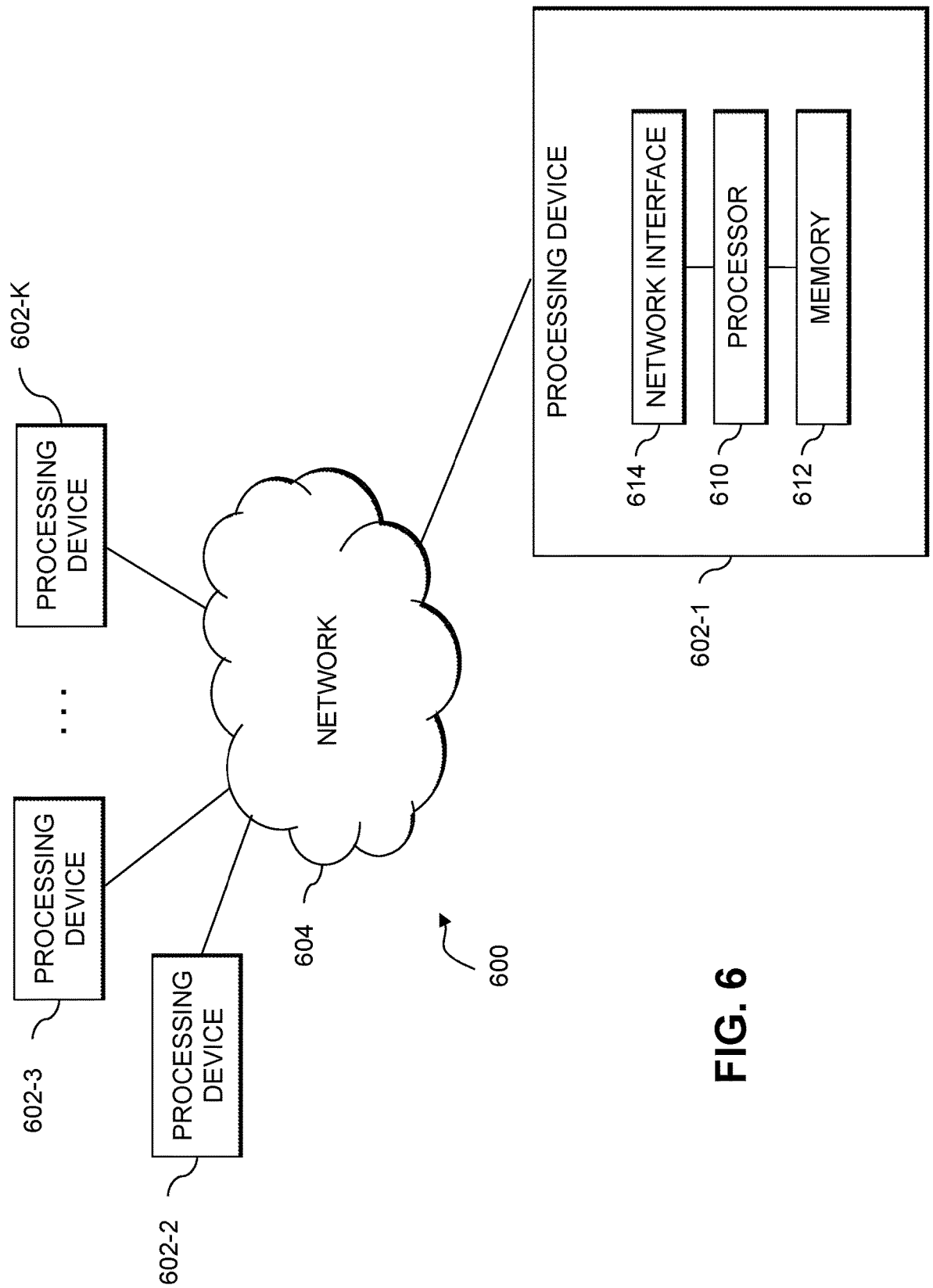

SOFTWARE-DEFINED SUSPECTED STORAGE DRIVE FAILURE IDENTIFICATION

FIELD

The field relates generally to information processing systems, and more particularly to storage in such systems.

BACKGROUND

In data protection and software-defined storage (SDS) solutions provided, for example, by a cluster of servers, the storage provided to compute nodes is an abstraction of a logical group of drives. Also, the provided storage is typically impacted if one or more of the drives fails. Such a drive failure event can cause the given solution to rescan given storage resources, rebuild related metadata, and utilize another drive to maintain at least one consistent redundant copy of the data blocks in question.

A drive can fail for a variety of reasons and failures are typically detected by a baseboard management controller (BMC), which also notifies subscribers of the failure(s). However, situations can arise wherein a given drive is not currently in a state of failure, but is not performing as per a solution's expectation, and the likelihood of future failing is increased. Such conditions are typically not detected by conventional storage management approaches, and such inability to detect suspected drive failure events by conventional storage management approaches can result in data unavailability and/or data loss.

SUMMARY

Illustrative embodiments of the disclosure provide techniques for software-defined suspected storage drive failure identification. An exemplary computer-implemented method includes implementing at least one software agent in an operating system associated with at least one storage system, wherein the at least one software agent is configured to monitor and process one or more predefined storage drive attributes. The method also includes obtaining, using the at least one software agent, attribute values for at least a portion of the one or more predefined storage drive attributes from one or more storage drives within the at least one storage system. Additionally, the method includes identifying, using the at least one software agent, at least one suspected failure among the one or more storage drives by processing at least a portion of the obtained attribute values using algorithmic logic, and performing at least one automated action based at least in part on the at least one identified suspected failure among the one or more storage drives.

Illustrative embodiments can provide significant advantages relative to conventional storage management approaches. For example, problems associated with data unavailability and/or data loss are overcome in one or more embodiments through utilizing at least one automated configurable software agent to identify at least one suspected failure among one or more storage drives within a storage system.

These and other illustrative embodiments described herein include, without limitation, methods, apparatus, systems, and computer program products comprising processor-readable storage media.

BRIEF DESCRIPTION OF THE DRAWINGS

FIGS. 5 and 6 show examples of processing platforms that may be utilized to implement at least a portion of an information processing system in illustrative embodiments.

DETAILED DESCRIPTION

Illustrative embodiments will be described herein with reference to exemplary computer networks and associated computers, servers, enclosures, storage drives, and/or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
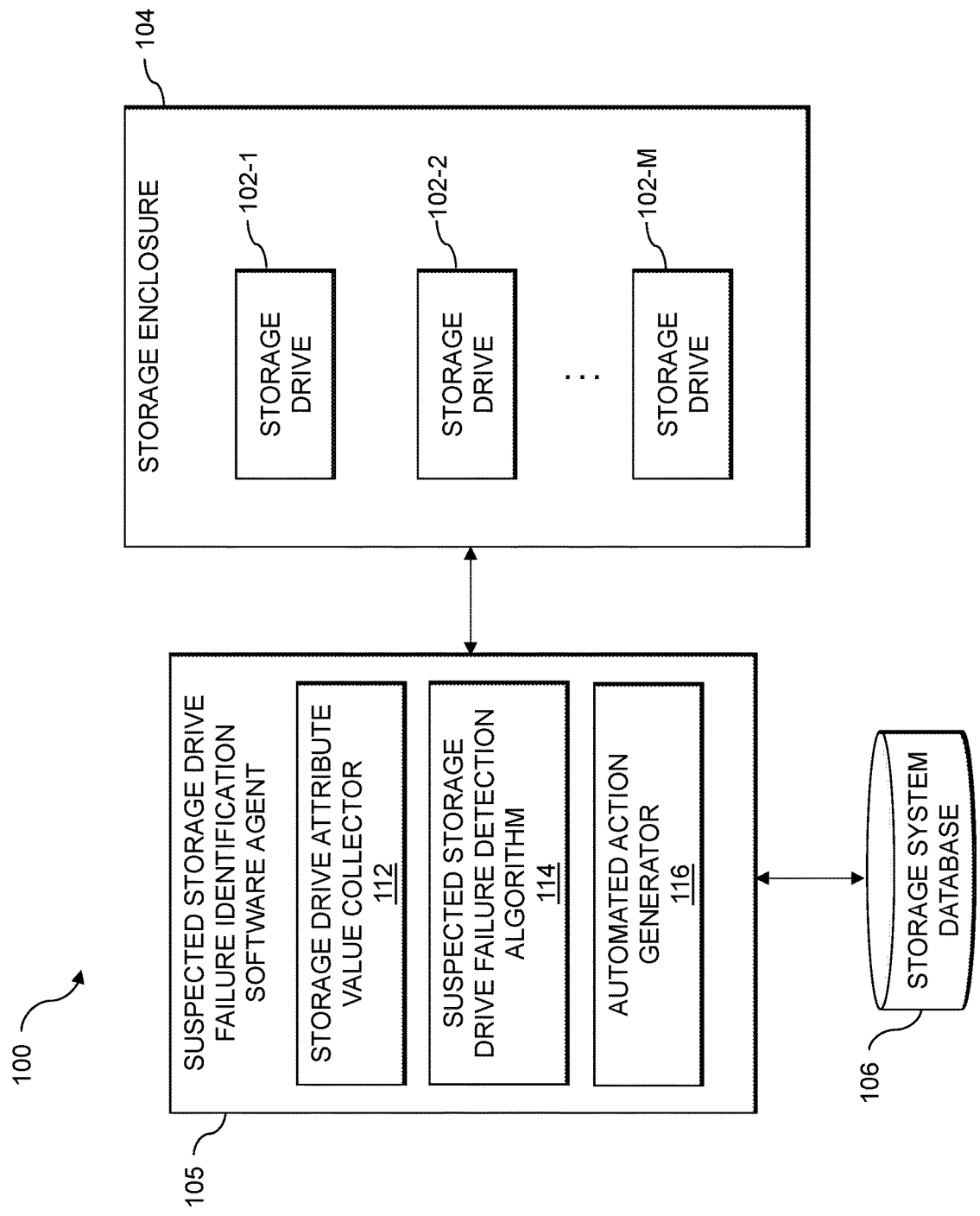
FIG. 1 shows an example information processing system configured for software-defined suspected storage drive failure identification in an illustrative embodiment.

FIG. 1 shows an information processing system 100 configured in accordance with an illustrative embodiment. The information processing system 100 comprises a plurality of storage drives 102-1, 102-2, . . . 102-M, collectively referred to herein as storage drives 102. The storage drives 102 are contained within storage enclosure 104, which is physically connected to a server or part of a server chassis. Also depicted as part of information processing system 100 is suspected storage drive failure identification software agent 105 (which can be resident, for example, on a server within information processing system 100).

The storage drives 102 may comprise, for example, drives and/or devices such as serial attached small computer system interface (SCSI) (SAS) hard disk drives (HDDs), SAS solid-state drives (SSDs), serial advanced technology attachment (SATA) HDDs, SATA SSDs, non-volatile memory express (NVMe) devices, etc. Also, such storage drives 102 can be contained within and/or associated with devices such as mobile telephones, laptop computers, tablet computers, desktop computers or other types of computing devices. Such devices are examples of what are more generally referred to herein as "processing devices." Some of these processing devices are also generally referred to herein as "computers."

The storage drives 102 in some embodiments comprise respective drives and/or devices associated with a particular company, organization or other enterprise. In addition, at least portions of the information processing system 100 may also be referred to herein as collectively comprising an "enterprise system." Numerous other operating scenarios involving a wide variety of different types and arrangements of processing devices, systems, and/or networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Also, as used herein, a network is assumed to comprise a portion of a global computer network such as the Internet, although other types of networks can be part of information processing system 100, for example, including a wide area network (WAN), a local area network (LAN), a satellite network, a telephone or cable network, a cellular network, a wireless network such as a Wi-Fi or WiMAX network, or various portions or combinations of these and other types of networks. The information processing system 100 in some embodiments therefore comprises combinations of multiple different types of networks, each comprising processing devices configured to communicate using internet protocol (IP) or other related communication protocols.

Additionally, suspected storage drive failure identification software agent 105 can have an associated database 106 configured to store data pertaining to at least one storage system, which comprise, for example, various attributes and performance characteristics of one or more storage drives contained therein.

The database 106 in the present embodiment is implemented using one or more storage systems associated with suspected storage drive failure identification software agent 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with suspected storage drive failure identification software agent 105 can be one or more input-output devices, which illustratively comprise keyboards, displays or other types of input-output devices in any combination. Such input-output devices can be used, for example, to support one or more user interfaces to suspected storage drive failure identification software agent 105, as well as to support communication between suspected storage drive failure identification software agent 105 and other related systems and devices not explicitly shown.

Additionally, suspected storage drive failure identification software agent 105 in the FIG. 1 embodiment is assumed to be implemented using at least one processing device (e.g., a server). Each such processing device generally comprises at least one processor and an associated memory, and implements one or more functional modules for controlling certain features of suspected storage drive failure identification software agent 105.

More particularly, suspected storage drive failure identification software agent 105 in an example embodiment can comprise and/or be connected to a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows suspected storage drive failure identification software agent 105 to communicate over at least one network with the storage drives 102, and illustratively comprises one or more conventional transceivers.

The suspected storage drive failure identification software agent 105 further comprises a storage drive attribute value collector 112, a suspected storage drive failure detection algorithm 114, and an automated action generator 116.

It is to be appreciated that this particular arrangement of modules 112, 114, and 116 illustrated in suspected storage drive failure identification software agent 105 of the FIG. 1 embodiment is presented by way of example only, and alternative arrangements can be used in other embodiments. For example, the functionality associated with modules 112, 114, and 116 in other embodiments can be combined into a single module, or separated across a larger number of modules. As another example, multiple distinct processors can be used to implement different ones of modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for software-defined suspected drive failure identification involving storage drives 102 of information processing system 100 is presented by way of illustrative example only, and in other embodiments additional or alternative elements may be used. Thus, another embodiment includes additional or alternative systems, devices and/or other network entities, as well as different arrangements of modules and other components. For example, in at least one embodiment, suspected storage drive failure identification software agent 105 and storage system database 106 can be on and/or part of the same processing platform.

An exemplary process utilizing modules 112, 114, and 116 of an example suspected storage drive failure identification software agent 105 in information processing system 100 will be described in more detail with reference to the flow diagram of FIG. 4.

Accordingly, at least one embodiment includes software-defined suspected storage drive failure identification. As detailed herein, such an embodiment includes generating and/or implementing an SDS solution to notify an integrated out-of-band management platform and/or remote access controller that at least one drive is suspected to be failing and requires initiation of a customer replaceable unit (CRU) workflow and/or field replaceable unit (FRU) workflow by a cluster manager. Once the drive is marked failed and/or failing, for example, by at least one remote access controller, an SDS workflow is automatically triggered to rescan and rebuild the storage abstraction.

As used herein, rescanning is a term commonly used in connection with SDS solutions. For example, when a compute node (e.g., a computer, server, etc.) connected to a SDS solution consumes block storage over Internet small computer systems interface (iSCSI) and/or NVMe over Fabrics (NVMeoF), the programs such as a database writes data to a local computer but the block storage is being served by a remote SDS cluster. One or more SDS solutions allow logical grouping of drives from different servers into storage pools, and a user/customer can create, for example, a storage pool of all HDDs and another pool of all SSDs. Such an SDS solution further allows creating a volume of specified size (e.g., in gigabyte/terabyte (GB/TB)) from a storage pool. This volume is then presented to a compute node as if the volume is an attached drive.

When data is written to a volume, such an SDS solution can spread the data to multiple drives in a storage pool. Also, the solution maintains at least two copies of data on drives from different servers to provide redundancy and avoid data loss in case of a server failure and/or drive failure. If a drive from the storage pool fails, then a single copy of data will be left. Because there are likely other drives available with storage, such an SDS solution can include scanning the servers for available drives and creating a second copy of the data on another drive. Such an SDS solution can then rebuild and/or update its internal data structure which tracks the volume, drives, and data mapping.

The rebuild and rescan process is automatic for one or more example SDS solutions based on notifications from a BMC pertaining to drive failure and/or replacement. Additionally, at least one embodiment includes notifying such an SDS solution of a suspected failure as well, through the same BMC interface, which will help the SDS solution create a second copy of the relevant data proactively, and notify the user/customer to replace the drive. Once the suspected drive is replaced, the SDS solution can rebalance the copies to evenly distribute data across at least one storage pool.

By way of further example, a Kubernetes cluster can involve a similar workflow. In connection with Kubernetes containers and/or pods, requests for persistent volume(s) can come from attached drives and/or remotely from a SAN such as an SDS solution. In case of attached drives, an agent monitors the health of the drives and notifies Kubernetes about a suspected failure and/or failing drive. This notification helps Kubernetes to move pods to another server and/or healthy volume.

The method(s) of detecting a suspected failure and/or failing drive can be different in a Kubernetes cluster versus an SDS solution such as noted above. Accordingly, at least one embodiment allows solutions to configure the agent with an initial rules set for identification based on drive performance and/or smart attributes, and then at runtime, solutions can update the rules set with a modified method of identification.

By way merely of further illustration, consider the following example use cases. In a first example use case, assume that a data center is managed by an infrastructure management console. In such an example context, many human-computer interaction (HCl) platform solutions are utilized in the data center, wherein multiple servers are grouped to form one cluster. Accordingly, such an environment typically has an infrastructure management solution for managing general infrastructure and a solution manager application for cluster management. Also, in such a data center managed by an infrastructure management console, there are multiple management operations on servers that are performed from via the infrastructure management console. For example, if there is a suspected drive failure and/or failing drive in one of the servers, it is important to notify the infrastructure management console in addition to at least one specific solution manager. The infrastructure management console typically does not have direct integration with solution managers but relies on integrated out-of-band management platform interfaces and/or remote access controller interfaces to monitor the server(s).

In a second example use case, assume the use of a cloud-based flex object storage solution based on at least one Kubernetes cluster, wherein such a solution is a scale-out architecture with hardware management for bare-metal servers, and which is configured, in part, to define and claim local persistent volumes. In an example embodiment, such a solution can include at least one interface to define rules that can identify suspected drive failures based on parameters such as, for example, drive health (e.g., good, suspect, bad, etc.), endurance or wearing level for SSDs, one or more smart counters and corresponding values, and/or a smart self-test status (e.g., in-progress (e.g., indicating a percent of progress completed), terminated, passed, etc.), wherein self-tests can be triggered by one or more application programming interfaces (APIs).

In at least one example embodiment, once a drive that participates in a Kubernetes exposed local persistent volume and is marked as suspected of failure and/or failing, a node management module generates a notification and publishes an event into the Kubernetes event stream to inform a disk management module, which in turn notifies the Kubernetes system that a particular persistent volume has been impacted. The Kubernetes internal scheduler then migrates the pod that consumes this persistent volume to another node, where a similar local persistent volume can be claimed. In such an embodiment, the node management module can receive one or more notifications via a systems management interface notification for one or more servers and/or via a custom interface for one or more servers. Such a notification can include, for example, a simple network management protocol (SNMP) trap or a mail transfer protocol (SMTP) (e.g., email) notification. Typically, each drive has a world wide name (WWN) and a world wide identifier (WWID), each server has a unique service tag, and each drive is inserted into a specific slot in the server. Accordingly, a notification such as detailed above, can include the server identifier, the slot identifier, the drive identifier, health status (e.g., previous and new health status such as OK, SUSPECT, etc.), and any extra information, if needed, regarding the reason the health status changed (e.g., uncorrected errors>100) so that the solution can call a BMC API to blink that drive to facilitate location of the drive in the server for one or more technicians and/or management entities. The solution can also request a log from the drive via the BMC API and/or agent to facilitate debugging of the issue(s).

Accordingly, as further detailed herein, one or more embodiments include enhancing storage monitoring and CRU and/or FRU workflows with software-defined suspected drive failure information to facilitate and/or enable proactive prevention of data loss.

Figure 2:
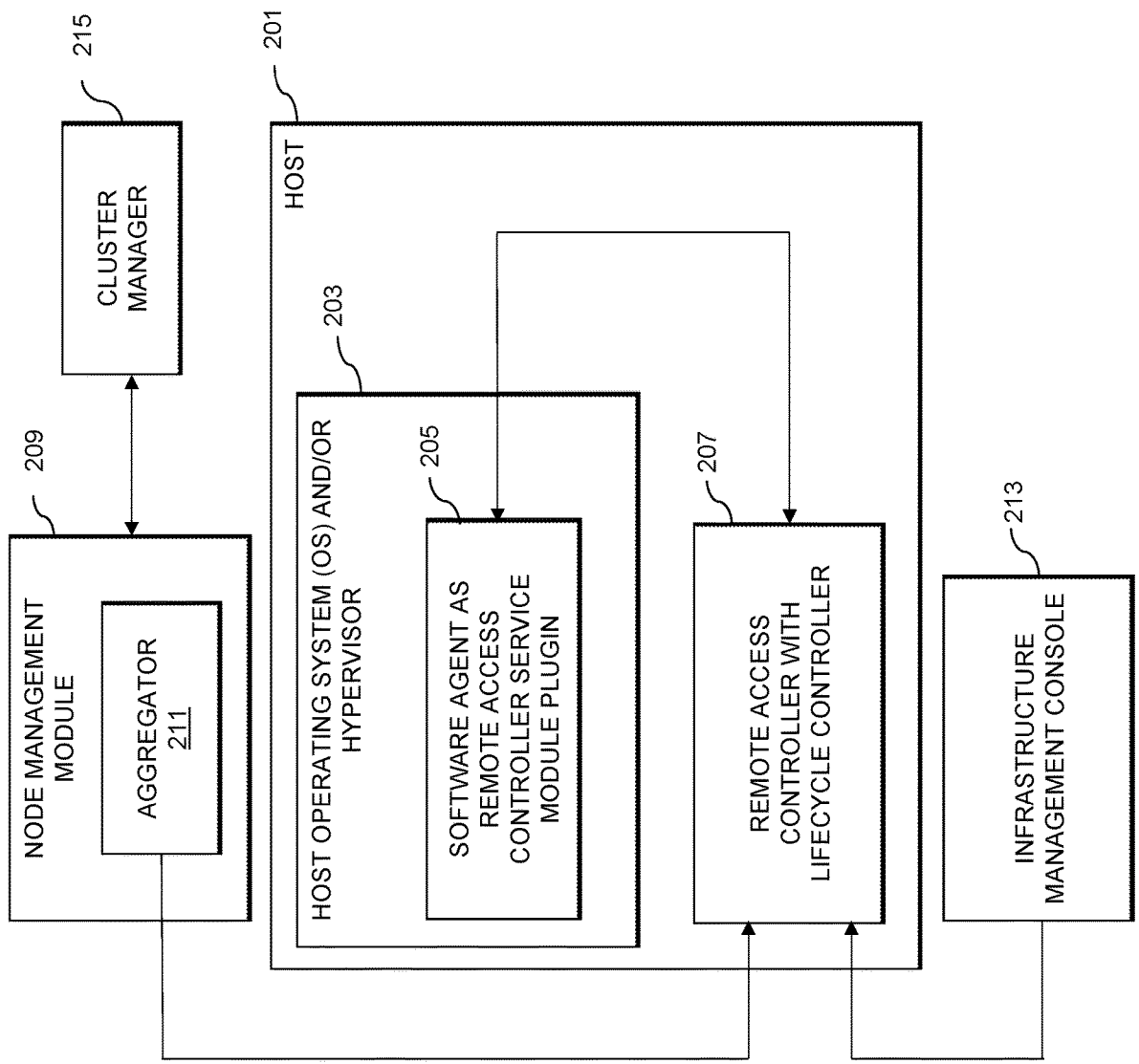
FIG. 2 shows an example information processing system configured for software-defined suspected storage drive failure identification in an illustrative embodiment.

FIG. 2 shows an information processing system configured for software-defined suspected storage drive failure identification in an illustrative embodiment. As illustrated in FIG. 2, at least one embodiment includes generating and/or implementing a software agent 205 running on an operating system (OS) and/or hypervisor 203 (of host 201, which can include, e.g., a blade server for a rack solution) which has direct access to one or more drives (including one or more enclosures) via one or more vendor libraries. As used herein, a storage enclosure includes a number of drives and can be used, for example, for expanding the storage capabilities of a given server. The software agent 205 can include metadata to define one or more rules for suspected drive failures and is configured to expose at least one API for solutions to edit rules at runtime. As used in this context, such metadata can include a rule file. The software agent 205 monitors drives and compares values of attributes based on rules defined in the metadata. If a rule tests positive, the software agent 205 will generate an alert and/or a notification. Accordingly, such metadata can also include data values (e.g., self-testing status, results, error counts, temperature, etc.) that can be retrieved from each drive.

As such, the software agent 205 monitors drives locally and publishes one or more notifications to remote access controller with lifecycle controller 207 via a service module-established local secure channel for one or more servers. As also depicted in FIG. 2, an aggregator 211 within node management module 209 subscribes to the remote access controller 207 notifications for hardware events and receives suspected drive failure notifications generated by software agent 205 based at least in part on rules defined thereby. More specifically, aggregator 211 can include a software service running as part of a PaaS or a solution manager (e.g., node management module 209) to aggregate inventory and monitoring data from a set of remote access controllers and/or servers (using, for example, a redfish interface), and can be used by cluster manager 215 to drive firmware and/or driver upgrades, firmware and/or remote access controller settings, etc., for a set of servers. Accordingly, in one or more embodiments, aggregator 211 includes a one-to-many remote access controller interface for cluster manager 215, which provides an abstraction so that other parts of cluster manager 215 do not need to deal with server hardware.

Figure 3:
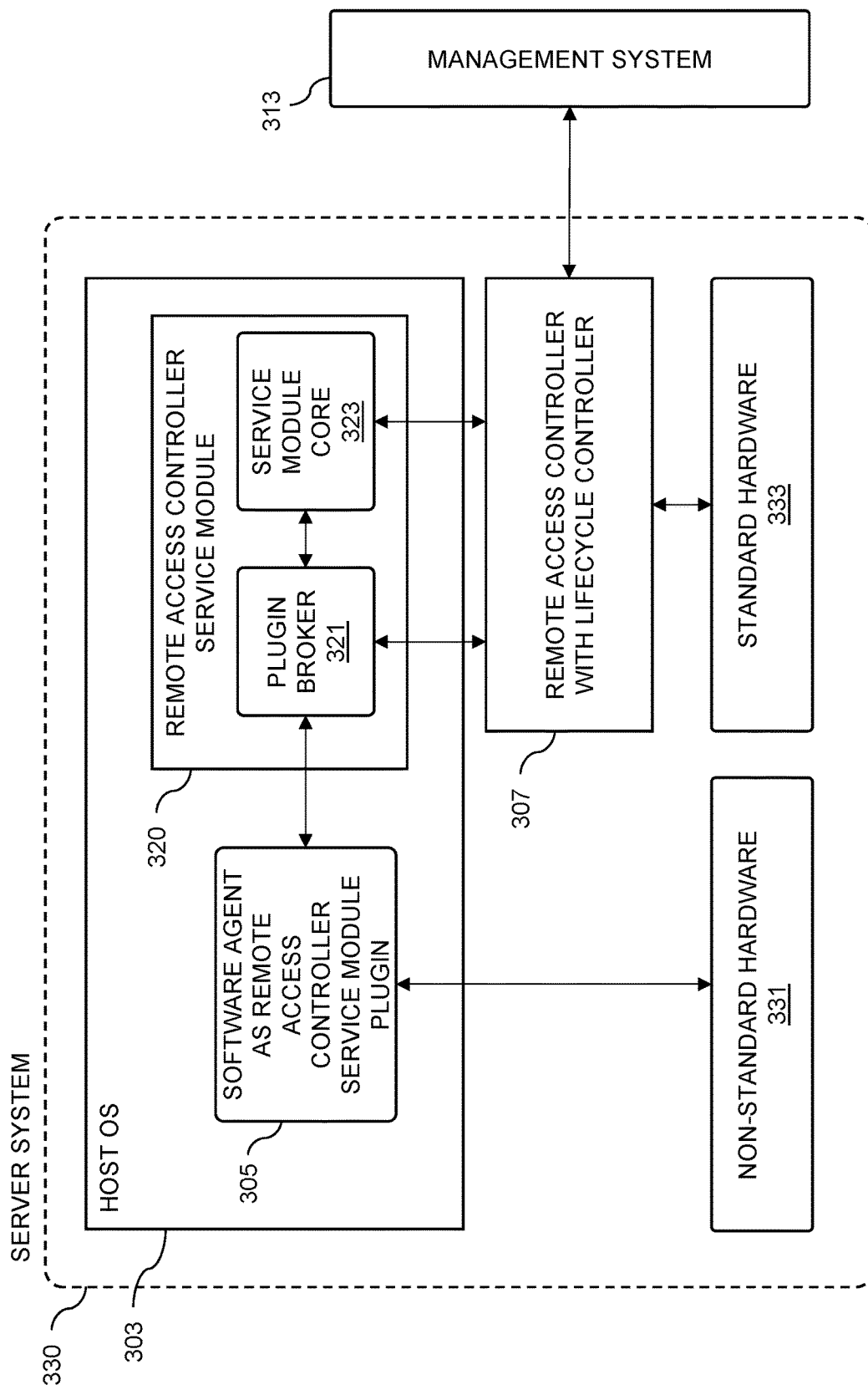
FIG. 3 shows an example information processing system configured for software-defined suspected storage drive failure identification in an illustrative embodiment.

An example software agent 205 and plugins is illustrated in further detail in FIG. 3. Also, remote access controller 207 can communicate, for example, with hardware devices such as disk drives, network cards, etc., over an I2C (sideband) interface. The software agent 205 running on host OS 203 is configured to connect with remote access controller 207 over a virtual network interface controller (NIC) interface to provide OS-level information. The software agent 205 and remote access controller 207 can implement, for example, a secure client/server protocol to exchange information. Plugins associated with software agent 205 can represent additional software agents in the host OS 203 configured and managed by software agent 205 to securely establish a client/server communication with the software agent 205. Such plugins can be used, for example, for monitoring hardware devices directly (in-band) using OS interfaces such as an input/output control (ioctl) call. A hardware vendor may provide a custom OS library which provides additional APIs to interact with the hardware, and one or more plugins can supplement remote access controller 207 with in-band information for some devices.

As also depicted in FIG. 2, infrastructure management console 213 can include, for example, a web application leveraging a systems management interface standard (e.g., redfish) to inventory, monitor, upgrade firmware and/or drives, update firmware and/or remote access controller settings, install OS, power on/off servers, etc., for a set of servers. Additionally, infrastructure management console 213 subscribes to the remote access controller 207 notifications for hardware events and receives suspected drive failure notifications generated by software agent 205.

Accordingly, as detailed herein and illustrated via FIG. 2, one or more embodiments can include extending management capabilities of a remote access controller via at least one OS plugin. As detailed herein, such an embodiment includes using one or more specially-configured methods and/or at least one direct interface to portions of hardware, and exposing the plugin via one or more remote access controller interfaces.

As also described herein, in at least one embodiment, a plugin blinks a drive light-emitting diode (LED) and/or enclosure LED based on one or more plugin-defined rules to facilitate identification of a specific drive marked as suspected of failing. By way of example, servers can have a front-panel LCD for providing a set of statistics or other information for the server. Additionally, there can be a number of slots for drives to allow hot plugging of drives. Also, each drive commonly comes with a set of LEDs visible from the front-side. For example, one such LED may indicate input-output activity, another may indicate health status (green, amber, etc.), and another may be used for identifying the drive by blinking when initiated.

FIG. 3 shows an information processing system configured for software-defined suspected storage drive failure identification in an illustrative embodiment. FIG. 3, within the context of server system 330, includes components that are at least in part similar to components details above in connection with FIG. 2. In order to establish a secure client/server communication channel between software agent 305 and remote access control service module 320, plugin broker 321 acts as a server and software agent 305 acts as a client. Plugin broker 321 launches and manages software agent 305 based on configuration metadata of all installed plugins.

Inside remote access control service module 320, the plugin broker 321 is a module implemented in connection with software agent 305 for the purpose of managing non-standard hardware 331. Plugin broker 321 and remote access controller with lifecycle controller 307 can use a redfish interface, and software agent 305 can send inventory data, health data, and monitoring data from non-standard hardware 331 to plugin broker 321 over an IPC socket to remote access controller 307 over a redfish interface to management system 313. The workflow proceeds from management system 313 to remote access controller 307, to plugin broker 321 to software agent 305, to non-standard hardware 331 to configure or update the non-standard hardware 331.

Also, service module core 323 and remote access controller 307 communicate over a private client/server protocol, and service module core 323 manages the lifecycle of plugin broker 321. Further, remote access controller 307 communicates with standard hardware 333 via an I2C interface.

As noted herein, in one or more example contexts, each server in a cluster and/or system can include a built-in management software for monitoring and a lifecycle manager (LCM) of hardware components via a BMC. One or more embodiments, accordingly, include generating and/or implementing a plugin architecture for platform management to enable exposing management capabilities of hardware (e.g., custom hardware) via existing interfaces established with the management system. In connection with an example embodiment, the management system can, for example, obtain access to standard and non-standard hardware via a consistent management interface until non-standard hardware is enabled through definition and adoption of one or more industry standards. In such an embodiment, migration of hardware from non-standard to standard device lists is seamless with respect to the management system.

As detailed herein, at least one embodiment includes defining suspected drive failures via one or more software-defined storage solutions which include implementing algorithms that determine the health of one or more storage devices. Such algorithms, as detailed herein, can detect one or more potential problems before a drive itself communicates that a problem exists. Additionally, in one or more embodiments, such algorithms can be defined differently based on how a particular solution defines determining the health of a given drive. Also, a variety of drive and/or device types can be used in connection with such an embodiment. By way merely of example, such devices types can include SAS HDDs, SAS SSDs, SATA HDDs, SATA SSDs, NVMe devices, etc. Each such device type can have a unique health calculation, and allowing the calculation to be defined in a configuration file and read upon startup, for example, can allow solutions to define their own health calculations. Values utilized in such calculations can be sourced, for example, from T10 log sense pages for SAS devices, T13 smart attribute values for SATA drives, and standard log data available from NVMe devices. Additionally or alternatively, utilizing JavaScript object notation (JSON) and/or extensible markup language (XML) as the configuration format(s) can facilitate solutions to customize such calculations, if and/or as necessary in one or more embodiments.

By way of illustration, one or more embodiments can include identifying suspected drive failures in accordance with the following example sequence of techniques, which can be carried out by at least one computer program and/or software agent on a loop until a point of completion is reached. Initially, such an example embodiment includes discovering and/or identifying storage drives in at least one storage system. By way of example, such discovery can be performed via an operating system associated with the at least one storage system. Additionally, for example, discovery for storage controller cards (e.g., LSI cards) can be carried out via message processing technology (MPT) commands to a host bus adapter (HBA), and discovery for one or more controller adapters can be carried out via at least one Storelib library.

Subsequent to discovering the storage drives, such an example embodiment includes obtaining and/or retrieving attribute data from each drive. By way of example, for SAS drives, attribute data can be obtained using T10 log sense commands via calls (e.g., ioctl calls) to the devices. Also, for SATA drives, attribute data (e.g., SMART attribute data) can be obtained using at least one T13 specification via calls (e.g., ioctl calls) to the devices. Additionally, for NVME drives, attribute data can be obtained using health information (e.g., log identifier 02h) via calls (e.g., ioctl calls) to the devices.

Using dynamically-defined metadata which describe attributes and logical operations, one or more embodiments include determining the status (e.g., good, suspected as failing, failed, etc.) of at least a portion of the identified drives by applying algorithmic logic to at least a portion of the obtained attribute data. Such algorithmic logic is configurable and can be defined, for example, at a protocol level and/or at a drive-type level. By way merely of illustration, example algorithmic logic can include health calculations such as the following:

<SAS><HDD><FAILED>(total_uncorrected_read_errors>100); OR
(total_uncorrected_write_errors>100); OR
(total_uncorrected_verify_errors>100)</FAILED></HDD></SAS>.

Additionally, by way of further illustration, example algorithmic logic can also include determinations such as the following:

```
if smart_status = 0x2CF4 OR
    msg3response.reallocated_sector_count >=100 OR
    msg2response.offline_uncorrectable_count >= 100 OR
    msg1Oresponse.ultradma_crc_error_count >= 10 OR
    (
        (self_test_status != SELF_TEST_GOOD) and
        (self_test_status != SELF_TEST_IN_PROGRESS) and
        (self_test_status != SELF_TEST_TERMINATED) and
        (self_test_status != SELF_TEST_INTERRUPTED)
    )
    THEN Drive Healt == BAD.
```

Additionally or alternatively, if a drive state changes, at least one embodiment includes changing the health state attribute and outputting the updated information to the remote access controller. In such an embodiment, an event is also generated and pushed to the remote access controller. Such an event might include, for example, the unique identifier for the device that has experienced a change to its health state, WWN of the drive and/or serial number of the drive, previous health state, new health state, and/or additional data regarding the reason that the health state changed (e.g., uncorrected errors>100). Further, in one or more example embodiments, a predefined interval of time would be allowed to elapse before a subsequent iteration of the above-noted techniques would be carried out.

Figure 4:
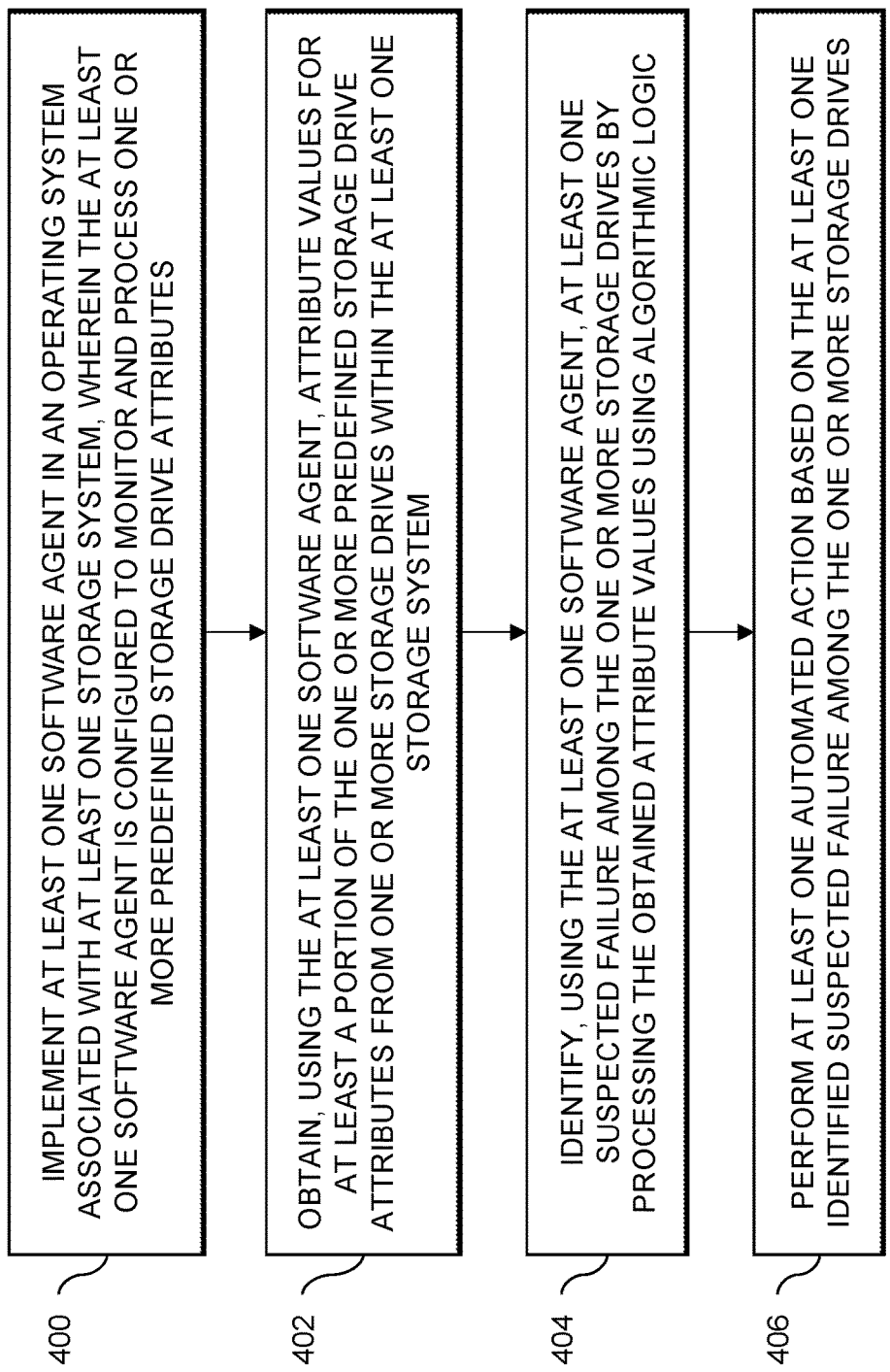
FIG. 4 is a flow diagram of a process for software-defined suspected storage drive failure identification, configurable by a platform-as-a-service (PaaS), in an illustrative embodiment.

FIG. 4 is a flow diagram of a process for software-defined suspected storage drive failure identification in an illustrative embodiment. It is to be understood that this particular process is only an example, and additional or alternative processes can be carried out in other embodiments.

In this embodiment, the process includes steps 400 through 406. These steps are assumed to be performed by suspected storage drive failure identification software agent 105 utilizing its modules 112, 114, and 116.

Step 400 includes implementing at least one software agent in an operating system associated with at least one storage system, wherein the at least one software agent is configured to monitor and process one or more predefined storage drive attributes. In at least one embodiment, the at least one software agent includes metadata used for defining one or more rules for determining at least one suspected storage drive failure. In such an embodiment, the one or more rules include at least one rule defining a suspected failure threshold value attributed to each of the one or more predefined storage drive attributes. Additionally, the one or more rules can be defined at a protocol level and/or at storage drive-type level. Also, in such an embodiment, the at least one software agent is configured to expose at least one application programming interface for editing at least a portion of the one or more rules at runtime.

Step 402 includes obtaining, using the at least one software agent, attribute values for at least a portion of the one or more predefined storage drive attributes from one or more storage drives within the at least one storage system. In at least one embodiment, obtaining the attribute values includes using one or more input/output control calls to the one or more storage drives. Step 404 includes identifying, using the at least one software agent, at least one suspected failure among the one or more storage drives by processing at least a portion of the obtained attribute values using algorithmic logic.

Step 406 includes performing at least one automated action based at least in part on the at least one identified suspected failure among the one or more storage drives. In one or more embodiments, performing the at least one automated action includes generating and outputting a notification of the at least one identified suspected failure to one or more of at least one remote access controller, at least one out-of-band management platform, at least one baseboard management controller, and at least one server cluster manager. Additionally or alternatively, in at least one embodiment, performing the at least one automated action includes initiating at least one customer replaceable unit workflow and/or at least one field replaceable unit workflow.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to utilize at least one automated configurable software agent to identify at least one suspected failure among one or more storage drives within a storage system. These and other embodiments can effectively overcome problems associated with data unavailability and/or data loss.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
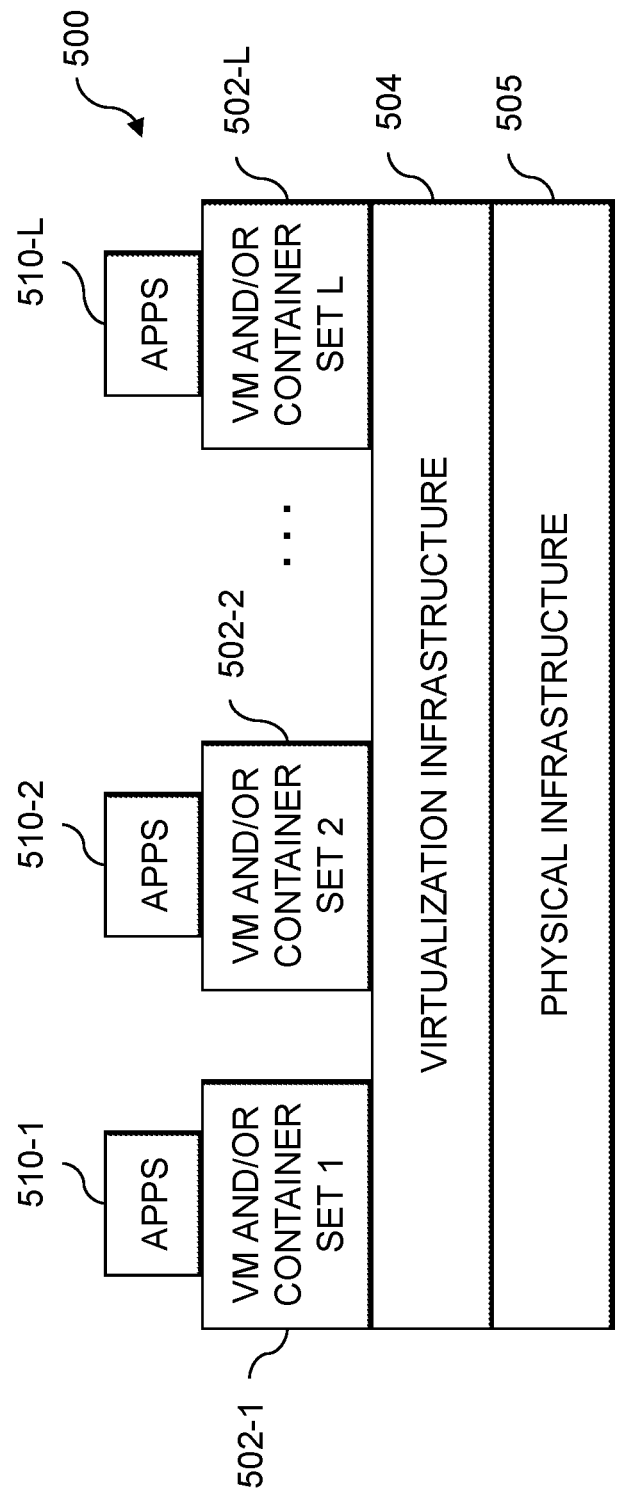

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
implementing at least one software agent in an operating system associated with at least one storage system, wherein the at least one software agent is configured to monitor and process one or more predefined storage drive attributes;
obtaining, using the at least one software agent, attribute values for at least a portion of the one or more predefined storage drive attributes from one or more storage drives within the at least one storage system, wherein obtaining the attribute values comprises executing, using at least one plug-in architecture associated with the at least one software agent, one or more input/output control calls to each of the one or more storage drives;
identifying, using the at least one software agent, at least one suspected failure among the one or more storage drives by processing at least a portion of the obtained attribute values using algorithmic logic; and
performing at least one automated action based at least in part on the at least one identified suspected failure among the one or more storage drives;
wherein the method is performed by at least one processing device comprising a processor coupled to a memory.

2. The computer-implemented method of claim 1, wherein the at least one software agent comprises metadata used for defining one or more rules for determining at least one suspected storage drive failure.

3. The computer-implemented method of claim 2, wherein the one or more rules comprise at least one rule defining a suspected failure threshold value attributed to each of the one or more predefined storage drive attributes.

4. The computer-implemented method of claim 2, wherein the one or more rules are defined at a protocol level.

5. The computer-implemented method of claim 2, wherein the one or more rules are defined at a storage drive-type level.

6. The computer-implemented method of claim 2, wherein the at least one software agent is configured to expose at least one application programming interface for editing at least a portion of the one or more rules at runtime.

7. The computer-implemented method of claim 1, wherein performing the at least one automated action comprises generating and outputting a notification of the at least one identified suspected failure to one or more of at least one remote access controller, at least one out-of-band management platform, at least one baseboard management controller, and at least one server cluster manager.

8. The computer-implemented method of claim 1, wherein performing the at least one automated action comprises initiating at least one customer replaceable unit workflow.

9. The computer-implemented method of claim 1, wherein performing the at least one automated action comprises initiating at least one field replaceable unit workflow.

10. A non-transitory processor-readable storage medium having stored therein program code of one or more software programs, wherein the program code when executed by at least one processing device causes the at least one processing device:
to implement at least one software agent in an operating system associated with at least one storage system, wherein the at least one software agent is configured to monitor and process one or more predefined storage drive attributes;
to obtain, using the at least one software agent, attribute values for at least a portion of the one or more predefined storage drive attributes from one or more storage drives within the at least one storage system, wherein obtaining the attribute values comprises executing, using at least one plug-in architecture associated with the at least one software agent, one or more input/output control calls to each of the one or more storage drives;
to identify, using the at least one software agent, at least one suspected failure among the one or more storage drives by processing at least a portion of the obtained attribute values using algorithmic logic; and
to perform at least one automated action based at least in part on the at least one identified suspected failure among the one or more storage drives.

11. The non-transitory processor-readable storage medium of claim 10, wherein the at least one software agent comprises metadata used for defining one or more rules for determining at least one suspected storage drive failure.

12. The non-transitory processor-readable storage medium of claim 11, wherein the one or more rules comprise at least one rule defining a suspected failure threshold value attributed to each of the one or more predefined storage drive attributes.

13. The non-transitory processor-readable storage medium of claim 10, wherein performing the at least one automated action comprises generating and outputting a notification of the at least one identified suspected failure to one or more of at least one remote access controller, at least one out-of-band management platform, at least one baseboard management controller, and at least one server cluster manager.

14. An apparatus comprising:
at least one processing device comprising a processor coupled to a memory;
the at least one processing device being configured:
to implement at least one software agent in an operating system associated with at least one storage system, wherein the at least one software agent is configured to monitor and process one or more predefined storage drive attributes;
to obtain, using the at least one software agent, attribute values for at least a portion of the one or more predefined storage drive attributes from one or more storage drives within the at least one storage system, wherein obtaining the attribute values comprises executing, using at least one plug-in architecture associated with the at least one software agent, one or more input/output control calls to each of the one or more storage drives;
to identify, using the at least one software agent, at least one suspected failure among the one or more storage drives by processing at least a portion of the obtained attribute values using algorithmic logic; and
to perform at least one automated action based at least in part on the at least one identified suspected failure among the one or more storage drives.

15. The apparatus of claim 14, wherein the at least one software agent comprises metadata used for defining one or more rules for determining at least one suspected storage drive failure.

16. The apparatus of claim 15, wherein the one or more rules comprise at least one rule defining a suspected failure threshold value attributed to each of the one or more predefined storage drive attributes.

17. The apparatus of claim 14, wherein performing the at least one automated action comprises generating and outputting a notification of the at least one identified suspected failure to one or more of at least one remote access controller, at least one out-of-band management platform, at least one baseboard management controller, and at least one server cluster manager.

18. The apparatus of claim 15, wherein the one or more rules are defined at a protocol level.

19. The apparatus of claim 15, wherein the one or more rules are defined at a storage drive-type level.

20. The apparatus of claim 15, wherein the at least one software agent is configured to expose at least one application programming interface for editing at least a portion of the one or more rules at runtime.

* * * * *